(12) United States Patent
Tokuchi

(10) Patent No.: US 10,762,670 B2
(45) Date of Patent: Sep. 1, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/059,058

(22) Filed: Aug. 9, 2018

(65) Prior Publication Data

US 2019/0180479 A1    Jun. 13, 2019

(30) Foreign Application Priority Data

Dec. 8, 2017   (JP) ................................ 2017-235821

(51) Int. Cl.
| | | |
|---|---|---|
| *G06F 3/01* | (2006.01) | |
| *G06T 11/00* | (2006.01) | |
| *G06T 11/60* | (2006.01) | |
| *G06T 7/529* | (2017.01) | |
| *G06F 1/16* | (2006.01) | |

(52) U.S. Cl.
CPC .......... *G06T 11/001* (2013.01); *G06F 1/1652* (2013.01); *G06F 3/016* (2013.01); *G06T 7/529* (2017.01); *G06T 11/60* (2013.01)

(58) Field of Classification Search
CPC ...... G06T 11/001; G06F 1/1652; G06F 3/016; G06F 3/01
See application file for complete search history.

(56) References Cited

U.S. PATENT DOCUMENTS

| | | | |
|---|---|---|---|
| 9,400,571 B2 | 7/2016 | Kamata et al. | |
| 2010/0110462 A1 | 5/2010 | Arai et al. | |
| 2010/0231540 A1* | 9/2010 | Cruz-Hernandez | G06F 3/016 345/173 |
| 2014/0281954 A1* | 9/2014 | Ullrich | G06F 15/0291 715/702 |
| 2015/0009168 A1* | 1/2015 | Levesque | H04M 19/04 345/174 |
| 2015/0170023 A1* | 6/2015 | Chatterjee | G06N 3/08 706/16 |
| 2015/0319153 A1* | 11/2015 | Tartz | H04L 63/08 726/4 |
| 2016/0209923 A1 | 7/2016 | Miyamoto et al. | |

FOREIGN PATENT DOCUMENTS

| | | |
|---|---|---|
| JP | 2010-114506 | 5/2010 |
| JP | 2010-152533 | 7/2010 |
| JP | 2014-026391 | 2/2014 |
| JP | 5780368 | 9/2015 |
| JP | 2016-133906 | 7/2016 |

* cited by examiner

*Primary Examiner* — Antonio A Caschera
(74) *Attorney, Agent, or Firm* — JCIPRNET

(57) ABSTRACT

An information processing apparatus includes a controller that controls texture and feel for depicting an image in which an original image is reflected on a target object. The controller controls the texture and the feel in accordance with an attribute of the original image and an attribute of the target object.

15 Claims, 9 Drawing Sheets

| TYPE | CAR |
|---|---|
| COLOR | GRAY |
| TEXTURE | METALLIC |
| TEXTURE IMAGE-CORRECTION VALUE | A |
| FEEL-SIMULATING VIBRATION CONDITIONS | FREQUENCY | B |
| | AMPLITUDE | C |

| MATERIAL | LINEN |
|---|---|
| COLOR | BROWN |
| TEXTURE | ROUGH |
| TEXTURE IMAGE-CORRECTION VALUE | D |
| FEEL-SIMULATING VIBRATION CONDITIONS — FREQUENCY | E |
| FEEL-SIMULATING VIBRATION CONDITIONS — AMPLITUDE | F |

FIG. 6

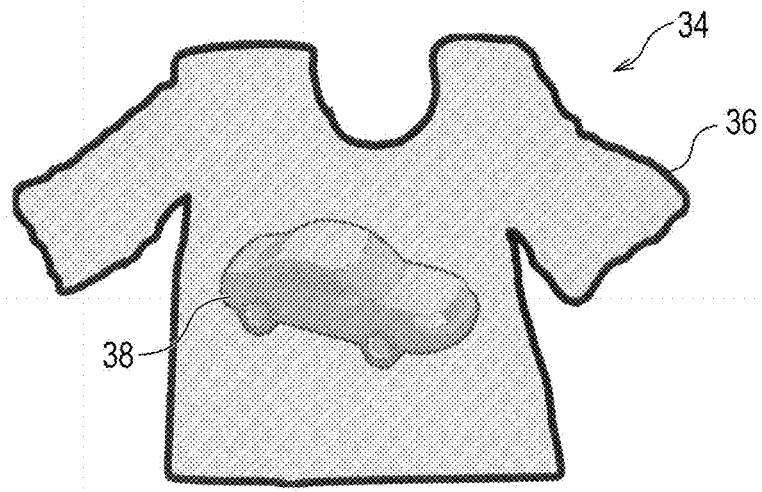

FIG. 7

| COMPOSITE | LINEN INCLUDING REFLECTED CAR IMAGE |
|---|---|
| COLOR | UNCOMBINED PART: BROWN |
| | COMBINED PART: GRAY MIXED WITH BROWN |
| TEXTURE | UNCOMBINED PART: ROUGH |
| | COMBINED PART: METALLIC AND SLIGHTLY ROUGH |
| TEXTURE IMAGE-CORRECTION VALUE | UNCOMBINED PART: D |
| | COMBINED PART: G |
| FEEL-SIMULATING VIBRATION CONDITIONS | FREQUENCY | UNCOMBINED PART: E |
| | | COMBINED PART: H |
| | AMPLITUDE | UNCOMBINED PART: F |
| | | SUPERIMPOSED PART: J |

| COMPOSITE | | LINEN INCLUDING REFLECTED CAR IMAGE |
|---|---|---|
| COLOR | | UNCOMBINED PART: BROWN |
| | | COMBINED PART: GRAY |
| TEXTURE | | UNCOMBINED PART: ROUGH |
| | | COMBINED PART: METALLIC |
| TEXTURE IMAGE-CORRECTION VALUE | | UNCOMBINED PART: D |
| | | COMBINED PART: A |
| FEEL-SIMULATING VIBRATION CONDITIONS | FREQUENCY | UNCOMBINED PART: E |
| | | COMBINED PART: B |
| | AMPLITUDE | UNCOMBINED PART: F |
| | | COMBINED PART: C |

FIG. 10

| COMPOSITE | LINEN INCLUDING REFLECTED CAR IMAGE | |
|---|---|---|
| COLOR | | UNCOMBINED PART: NULL (INITIAL VALUE) |
| | | COMBINED PART: GRAY |
| TEXTURE | | UNCOMBINED PART: NULL (INITIAL VALUE) |
| | | COMBINED PART: METALLIC |
| TEXTURE IMAGE-CORRECTION VALUE | | UNCOMBINED PART: NULL (INITIAL VALUE) |
| | | COMBINED PART: A |
| FEEL-SIMULATING VIBRATION CONDITIONS | FREQUENCY | UNCOMBINED PART: NULL (INITIAL VALUE) |
| | | COMBINED PART: B |
| | AMPLITUDE | UNCOMBINED PART: NULL (INITIAL VALUE) |
| | | COMBINED PART: C |

FIG. 11

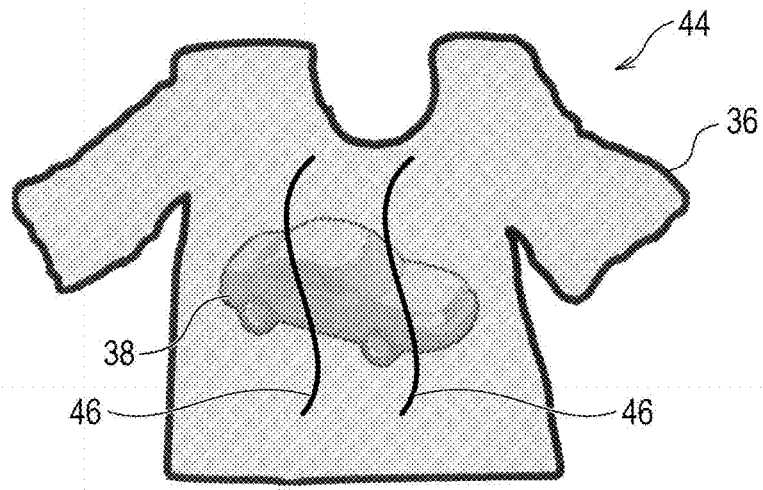

FIG. 13

| MATERIAL | | LINEN |
|---|---|---|
| CHARGE | | 1000 YEN |
| COLOR | | BROWN |
| TEXTURE | | ROUGH |
| TEXTURE IMAGE-CORRECTION VALUE | | D |
| FEEL-SIMULATING VIBRATION CONDITIONS | FREQUENCY | E |
| | AMPLITUDE | F |

FIG. 14

| MATERIAL | | CLOTH α |
|---|---|---|
| CHARGE | | 3000 YEN |
| COLOR | | RED |
| TEXTURE | | ROUGH |
| TEXTURE IMAGE-CORRECTION VALUE | | P |
| FEEL-SIMULATING VIBRATION CONDITIONS | FREQUENCY | Q |
| | AMPLITUDE | R |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-235821 filed Dec. 8, 2017.

BACKGROUND

Technical Field

The present invention relates to an information processing apparatus and a non-transitory computer readable medium.

SUMMARY

According to an aspect of the invention, there is provided an information processing apparatus including a controller that controls texture and feel for depicting an image in which an original image is reflected on a target object. The controller controls the texture and the feel in accordance with an attribute of the original image and an attribute of the target object.

BRIEF DESCRIPTION OF THE DRAWINGS

An exemplary embodiment of the present invention will be described in detail based on the following figures, wherein:

FIG. 6 is a view illustrating a composite image;

FIG. 7 is a table illustrating attribute information of the composite image;

FIG. 10 is a table illustrating attribute information of the composite image;

FIG. 11 is a view illustrating a composite image;

FIG. 13 is a table illustrating attribute information of the target object;

FIG. 14 is a table illustrating attribute information of a target object; and

DETAILED DESCRIPTION

Figure 1:
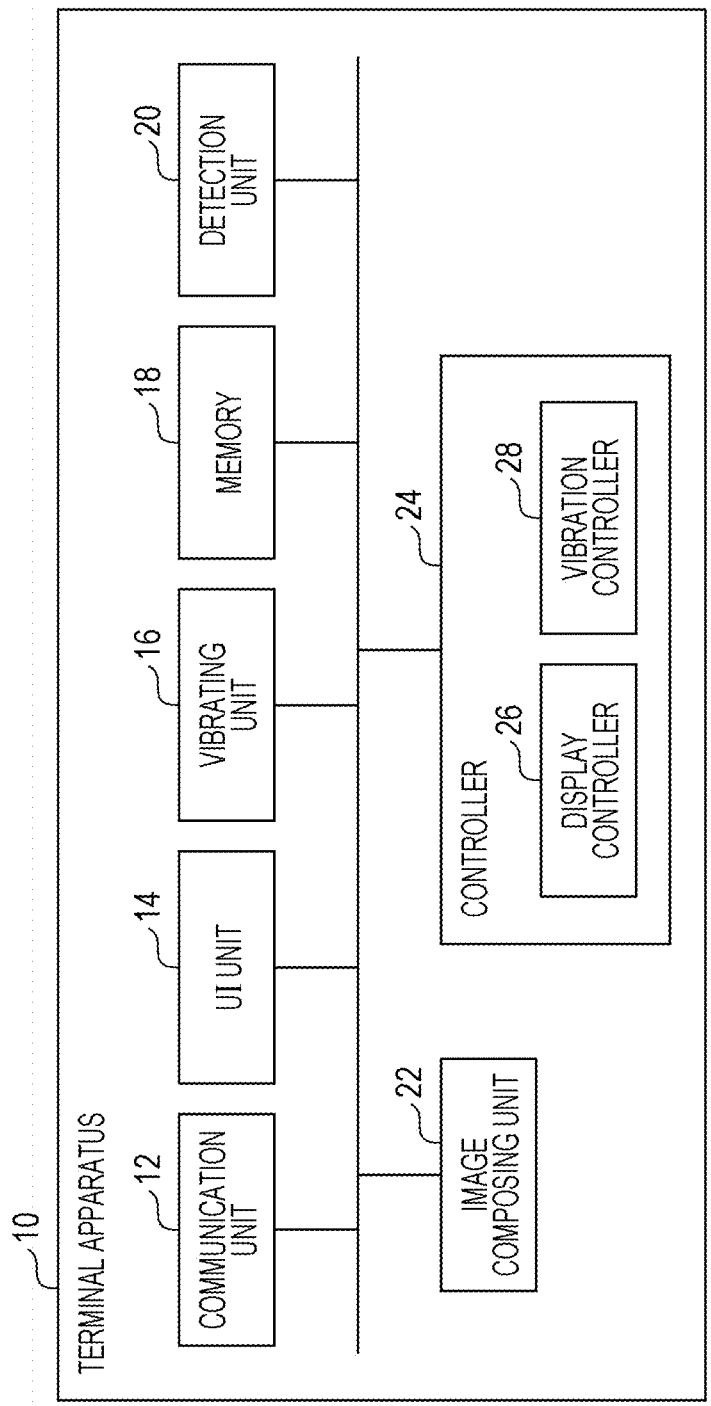
FIG. 1 is a block diagram illustrating the configuration of a terminal apparatus according to the exemplary embodiment of the present invention.

Hereinafter, a terminal apparatus taken as an example of an information processing apparatus according to an exemplary embodiment will be described. FIG. 1 illustrates an example terminal apparatus according to the exemplary embodiment.

A terminal apparatus 10 is an apparatus such as a personal computer (PC), a tablet PC, a smartphone, or a mobile phone. The terminal apparatus 10 may be a wearable terminal (such as a watch terminal, a wristband terminal, a glass terminal, a ring terminal, a contact lens terminal, an implanted terminal, or a hearable terminal). The terminal apparatus 10 may have a flexible display as a display device. As the flexible display, for example, an organic electroluminescence (EL) display (a flexible organic EL display), an electronic paper display, or a flexible liquid crystal display is used. A flexible display using a display system other than these may also be used. The flexible display is a display having a flexibly deformable display portion, and is, for example, a bendable, foldable, windable, twistable, and extendable display. The terminal apparatus 10 may be composed of the flexible display only or composed of the flexible display and the other components that are functionally or physically separated from the flexible display.

Hereinafter, the configuration of the terminal apparatus 10 will be described in detail with reference to FIG. 1.

A communication unit 12 is a communication interface and has function of transmitting data to a different apparatus and a function of receiving data from the different apparatus. The communication unit 12 may be a communication interface having a wireless communication function or may be a communication interface having a wired communication function. The communication unit 12 supports one or more communication standards (methods). The communication unit 12 may communicate with a communication counterpart in accordance with a communication standard appropriate for the communication counterpart (that is, the communication standard supported by the communication counterpart). The communication standards (methods) are, for example, infrared communication, visible light communication, Wi-Fi (registered trademark) communication, and proximity wireless communication (such as near field communication (NFC)). For the proximity wireless communication, Felica (registered trademark), Bluetooth (registered trademark), radio frequency identifier (RFID), or the like is used. It goes without saying that a wireless standard using a different method may be used for the proximity wireless communication. The communication unit 12 may perform switching between communication standards or frequency bands in accordance with the communication counterpart or the ambient environment.

A user interface (UI) unit 14 is a user interface unit and includes a display and an operation unit. The display is a display device such as a liquid crystal display. The display may be a flexible display. The operation unit is an input device such as a touch panel or a keyboard. The operation unit may be a user interface serving both as the display and the operation unit (including, for example, a touch display and a device for electronically displaying a keyboard or the like on the display). For example, a capacitive touch panel or a resistive touch panel is used as the touch panel. A touch panel other than these may be used, as a matter of course. The UI unit 14 may also include a sound collector such as a microphone and a sound generator such as a speaker. In this case, information may be input in the terminal apparatus 10 by using voice and may also be output as voice.

A vibrating unit 16 is disposed on the display of the UI unit 14 and has a function of applying vibration to the surface of the display. The vibrating unit 16 may apply the same vibration to all of portions of the surface or different vibration depending on the portion of the surface. The vibrating unit 16 is a vibratory element that generates vibration, for example, in an ultrasonic wave band (for example, an acoustic wave band of 20 kHz or higher). As such a vibratory element, for example, a piezoelectric element is used. It goes without saying that the vibrating unit 16 may be a vibratory element that generates vibration in a band other than the ultrasonic wave band and a vibratory element other than the piezoelectric element may be used. Driving the vibrating unit 16 causes vibration of the surface of the display, and thereby feel feedback (tactual feedback) is provided. In other words, the material of an object displayed on the display and feel of the object are reflected on the surface of the display, and texture and the feel (tactual sense) is provided to a user. Vibration varying with the portion of the display may be applied to simulate texture and feel that vary with the portion. In more detail explanation, vibrating the surface of the display causes a change in frictional resistance of the surface of the display, and texture and feel are thereby simulated. Controlling the frequency or the amplitude of the vibration, controlling turning on and off of the vibration, or the like enables the frictional resistance to be changed. For example, forming a low-friction area, a high-friction area, both the low-friction area and the high-friction area, and the like on the surface of the display enables a slick texture, a rough texture, an uneven texture, and the like to be simulated on the surface. For example, the slick texture is simulated by forming the low-friction area, the rough texture is simulated by forming the high-friction area, and the uneven texture is simulated by alternately arranging the low-friction area and the high-friction area. The vibrating unit 16 is driven by a driving signal output by a vibration controller 28 (described later). The frequency and the amplitude of the vibration generated by the vibrating unit 16 are determined in accordance with the driving signal. Changing the frequency or the amplitude causes a change in texture or feel.

Texture is, for example, a visual sense and a tactual sense experienced from a material of an object. Feel (tactual sense) is, for example, feel that a person experiences at the time of touching an object. The concepts of the texture and the feel are not mutually exclusive. The concept of the texture and the concept of the feel may partially overlap and do not have to completely overlap. Examples of the texture and the feel include a rough texture, a slick texture, a metallic texture, and an uneven texture. The texture and the feel on the screen are simulated by using the vibration of the screen, the hue of an image, and the like. If the vibration or the hue is changed, different texture or a different feel is thereby simulated.

A memory 18 is a memory device such as a hard disk or a memory (for example, a solid state disk (SSD)). The memory 18 stores, for example, various pieces of data, various programs (for example, the operating system (OS)), and various application programs (application software)). It goes without saying that these may be stored in separate memory devices or in one memory device.

A detection unit 20 has a function of detecting a change in a portion of the display. The detection unit 20 is a sensor such as a pressure sensor, a temperature sensor, a humidity sensor, an accelerometer, or a gyroscopic sensor. The detection unit 20 detects, for example, a change in pressure, a change in capacitance, a change in bending, a change in an optical characteristic, humidity, temperature, acceleration, or the orientation of each portion (for example, each pixel) of the display (for example, a touch panel or a flexible display). Note that a sensor installed in an apparatus other than the terminal apparatus 10 or in a place other than the place thereof may detect the change described above or a value.

An image composing unit 22 has a function of generating a composite image by combining an original image and an image depicting a target object. Hereinafter, an image depicting a target object is referred to as a "target-object image". The target object is a real thing on which the original image is reflected. In other words, the original image is an image reflected on the target object that is the real thing. The original image, the target-object image, and the composite image may be a still image, a moving image, a two-dimensional image, a three-dimensional image, or a solid image formed in space. The target object is not particularly limited as long as the target object is a real thing. Any real thing such as clothing, tableware, home appliances, food, stationery, toys, books, and furniture may be handled as the target object. The term "to reflect" denotes, for example, to form an original image on a target object in a state where an attribute of the original image is corrected on the basis of the attribute of the target object or to form the original image on the target object without correcting the attribute of the original image. Specifically, the term "to reflect" denotes to print the original image on the target object. It goes without saying that the original image may be formed on the target object by a technique other than printing. A composite image is an image representing the state in which the original image is reflected on the target object in this manner. The attribute is a color, texture, a value representing texture (a texture image-correction value), vibration conditions for simulating feel (such as a frequency and amplitude), or the like.

The image composing unit 22 generates attribute information of the composite image by using the attribute information of the original image and the attribute information of the target object. The attribute information of the original image is information indicating the attributes of the original image. The attributes may be determined for each of portions of the original image and thus may vary with the portion. Alternatively, the same attribute may be determined for the portions. The attribute information of the target object is information indicating the attributes of the target object. The attributes may be determined for each portion of the target object and thus may vary with the portion. Alternatively, the same attribute may be determined for the portions. The attribute information of the composite image includes information indicating the attributes of the original image reflected on the target object and information indicating the attributes of the target object. If the attributes are determined for each portion in the target object or the original image, the attributes are determined also for each portion in the composite image. For example, the image composing unit 22 corrects the attribute information of the original image by using the attribute information of the target object and generates the attribute information of the composite image including the corrected attribute information of the original image. The composite image representing the state where the original image is reflected on the target object is thereby generated. If the attributes are determined for each portion in the target object or the original image, the image composing unit 22 corrects the attribute information for each portion. It goes without saying that the image composing unit 22 may generate the attribute information of the composite image including the attribute information of the original image without correcting the attribute information of the original image.

Note that data regarding the original image and data regarding the target-object image may be stored in the memory 18 of the terminal apparatus 10. The data may also be stored in an external apparatus other than the terminal apparatus 10 and then may be provided from the external apparatus to the terminal apparatus 10. For example, the terminal apparatus 10 may acquire the data regarding the original image and the data regarding the target-object image from the external apparatus by using a communication path such as the Internet.

A controller 24 has a function of controlling operations of the components of the terminal apparatus 10. For example, the controller 24 performs running of the various programs, control of communication performed by the communication unit 12, control of an information notification using the UI unit 14 (such as information indication and audio output), receiving information input using the UI unit 14, and the like. The controller 24 includes a display controller 26 and the vibration controller 28.

The display controller 26 has a function of displaying various pieces of information on the display of the UI unit 14. For example, the display controller 26 displays, on the display, an image such as the original image, a target-object image, or a composite image.

The vibration controller 28 has a function of controlling the vibrating unit 16. For example, the vibration controller 28 controls the vibrating unit 16 in accordance with the attribute information of the image displayed on the display and thereby simulates, on the display, texture and feel based on the attribute information. Specifically, the vibration controller 28 causes the vibrating unit 16 to vibrate at a frequency and an amplitude that are determined on the basis of the attribute information of the image. The vibration controller 28 may control the vibration for each portion of the image. For example, if attributes are determined for each portion, the vibration controller 28 controls the vibration of the portion in accordance with the attributes of the portion. When a designator (such as a finger of the user or a stylus) touches the surface of the display, and when the detection unit 20 detects the touch, the vibration controller 28 may control the vibrating unit 16 in accordance with the attribute information of the image displayed at the position where the designator touches. Texture and feel based on the attribute information are thereby simulated at the position where the designator touches. For example, if an original image is displayed on the display, the vibration controller 28 causes the vibrating unit 16 to vibrate at the frequency and the amplitude determined on the basis of the attributes of the original image. If a target-object image is displayed on the display, the vibration controller 28 causes the vibrating unit 16 to vibrate at the frequency and the amplitude determined on the basis of the attributes of the target object depicted in the target-object image. If a composite image is displayed on the display, the vibration controller 28 causes the vibrating unit 16 to vibrate at the frequency and the amplitude determined on the basis of the attribute information of the composite image. The vibration controller 28 also controls turning on and off of the vibration caused by the vibrating unit 16. The vibration controller 28 may simulate texture and feel on the display not only by controlling the frequency and the vibration for the vibration caused by the vibrating unit 16 but also by controlling turning on and off of the vibration.

Hereinafter, the terminal apparatus 10 according to the exemplary embodiment will be described in further detail.

Figures 2, 3:
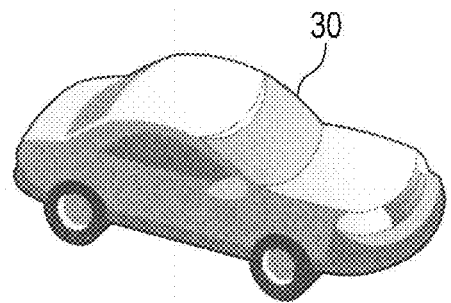
FIG. 2 is a view illustrating an original image.
FIG. 3 is a table illustrating attribute information of the original image.

An original image will be described with reference to FIGS. 2 and 3. FIG. 2 illustrates an example of the original image, and FIG. 3 illustrates an example of attribute information of the original image. As illustrated in FIG. 2, an original image 30 is an image depicting a car. As illustrated in FIG. 3, for example, the color (hue) of the original image (that is, the color of the car depicted in the original image), texture of the original image (that is, the texture of the car depicted in the original image), a texture image-correction value of the original image (a value representing the texture), and feel-simulating vibration conditions are determined as the attributes of the original image. The feel-simulating vibration conditions are vibration conditions for simulating feel of the original image (that is, feel of the car depicted in the original image) and include a frequency condition and an amplitude condition. In the example illustrated in FIG. 3, the color of the original image is Gray, the texture is Metallic, the texture image-correction value is A, the frequency is B, and the amplitude is C. Actually, a value for simulating texture in an image is used as A, and a value for simulating feel is used as each of B and C.

Attributes may be determined for each portion of the original image, and the attribute information of the original image may include pieces of information each indicating the attributes of the portion. For example, a color, texture, a texture image-correction value, and feel-simulating vibration conditions are determined for each portion. These may vary with the portion or may be common to the portions.

Figures 4, 5:
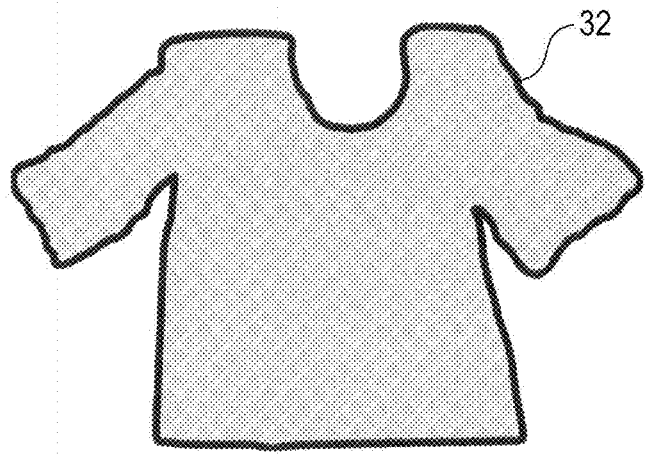
FIG. 4 is a view illustrating a target object.
FIG. 5 is a table illustrating attribute information of the target object.

A target object will be described with reference to FIGS. 4 and 5. FIG. 4 illustrates an example of the target object, and FIG. 5 illustrates an example of the attribute information of the target object. As illustrated in FIG. 4, a target object 32 is a T-shirt. The material of the T-shirt is Linen. As illustrated in FIG. 5, for example, the color of the target object, the texture of the target object, the texture image-correction value of the target object, and the feel-simulating vibration conditions are determined as the attributes of the target object. The feel-simulating vibration conditions are vibration conditions for simulating feel of the target object. In the example illustrated in FIG. 5, the color of the target object is Brown, the texture is Rough, the texture image-correction value is D, the frequency is E, and the amplitude is F. Actually, a value for simulating texture in an image is used as D, and a value for simulating feel is used as each of E and F.

The attributes may be determined for each portion of the target object, and the attribute information of the target object may include pieces of information each indicating the attributes of the portion. For example, a color, texture, a texture image-correction value, and feel-simulating vibration conditions are determined for each portion. These may vary with the portion or may be common to the portions.

For example, the user selects an original image and a target object to be combined. Specifically, the display controller 26 displays target-object image candidates on the display. The user selects a target-object image to be combined by using the UI unit 14 from among the target-object image candidates. Likewise, the display controller 26 displays original image candidates on the display. The user selects an original image to be combined by using the UI unit 14 from among the original image candidates. Data regarding the candidates may have been stored in the memory 18 of the terminal apparatus 10, may be acquired via a communication path such as the Internet, or may be acquired from an external apparatus. As described above, if the user selects a target-object image and an original image and gives a composing instruction, the image composing unit 22 generates a composite image by combining the original image and the target-object image.

Hereinafter, a composite image will be described with reference to FIGS. 6 and 7. FIG. 6 illustrates an example of the composite image, and FIG. 7 illustrates an example of the attribute information of the composite image. In an example, the user has selected the original image 30 depicting the car and a target-object image depicting the target object 32 that are to be combined. In this case, the image composing unit 22 generates a composite image by combining the original image 30 and the target-object image. In the combining, the image composing unit 22 corrects the attributes of the original image 30 on the basis of the attributes of the target object 32 (target-object image). FIG. 6 illustrates a composite image 34 generated from the combining. The composite image 34 is an image representing a state where the original image 30 is reflected (formed) on the target object 32 and composed of a target-object image 36 depicting the target object 32 and an original image 38. The original image 38 is an image having undergone the correction of the attributes of the original image 30 performed on the basis of the attributes of the target object 32. In the example illustrated in FIG. 6, the original image 30 is combined with the target-object image 36 in accordance with a specification in which a pattern corresponding to the original image 30 is knitted in the target-object image 36.

As illustrated in FIG. 7, the color of the composite image (composite), the texture of the composite image (composite), the texture image-correction values of the composite image (composite), and the feel-simulating vibration conditions are determined as the attributes of the composite image 34 (the attributes of the composite generated by reflecting the original image 30 on the target object 32). The feel-simulating vibration conditions are vibration conditions for simulating feel in the composite image (composite).

Uncombined part illustrated in FIG. 7 is a part in which the original image 30 is not combined in the composite image 34. That is, the uncombined part is a part of the target-object image 36, and the original image 30 is not combined in this part. Further, to put it in other words, the uncombined part is a part other than the original image 38 in the composite image 34. Combined part is a part in which the original image 30 is combined in the composite image 34, that is, a part in which the original image 30 and the target-object image 36 are combined. Further, to put it in other words, the combined part is a part occupied by the original image 38 in the composite image 34.

Since the original image 30 is not combined with the target-object image 36 in the uncombined part (part other than the original image 38), the attributes of the uncombined part are the same as the attributes of the target-object image 36 (target object 32). In other words, the color of the uncombined part is Brown that is the same as that of the color of the target object 32, the texture of the uncombined part is Rough that is the same as the texture of the target object 32, the texture image-correction value of the uncombined part is D that is the same as the texture image-correction value of the target object 32, the frequency of the uncombined part is E that is the same as the frequency of the target object 32, and the amplitude of the uncombined part is F that is the same as the amplitude of the target object 32.

In the combined part (part occupied by the original image 38), the original image 30 is combined with the target-object image 36, and thus the combined part has the attributes corrected on the basis of the attributes of the target object 32. In other words, the color of the combined part is a color generated by reflecting the color of the original image 30 on the color of the target object 32 and, for example, Gray mixed with brown. The texture of the combined part is texture in which the texture of the original image 30 (metallic texture) and the texture of the target object 32 (rough texture) are mixed together. The texture image-correction value of the combined part is G that is a value representing the texture in the composite. The feel of the combined part is feel in which the feel of the original image 30 and the feel of the target object 32 are mixed together, the frequency is H, and the amplitude is I. Actually, a value for representing texture in an image is used as G, and a value for simulating feel is used as each of H and J.

As described above, the color, the texture, and the feel differ between the uncombined part and the combined part. Note that when the composite image 34 is displayed on the display, a color, texture, and feel differ between the composite image 34 and the other part.

If attributes are determined for each portion in an original image or a target object, a composite image is generated in such a manner that the attributes of the original image are reflected on the attributes of the target object for each portion.

After the composite image 34 is generated as described above, the display controller 26 displays the composite image 34 on the display of the UI unit 14. In displaying, the display controller 26 displays, on the display, the composite image 34 having the color and the texture indicated by the attribute information of the composite image 34 (for example, attribute information illustrated in FIG. 7). Specifically, the display controller 26 displays, for the uncombined part in the composite image 34, an image having the color and the texture of the uncombined part and displays, for the combined part in the composite image 34, an image having the color and the texture of the combined part. The vibration controller 28 controls the vibrating unit 16 in accordance with the feel-simulating vibration conditions indicated by the attribute information of the composite image 34 and thereby simulates the texture and the feel in the composite image 34 (composite). Specifically, the vibration controller 28 causes, for the uncombined part in the composite image 34, the vibrating unit 16 to vibrate at the frequency and the amplitude for the uncombined part and causes, for the combined part in the composite image 34, the vibrating unit 16 to vibrate at the frequency and the amplitude for the combined part. Note that the vibration controller 28 may cause the vibrating unit 16 to vibrate by using at least one of parameters for the frequency and the amplitude.

By performing the display control and the vibration control as described above, the hue, the texture, and the feel of the target object 32 are acquired from the uncombined part in the composite image 34 (part other than the original image 38). In contrast, the attributes in the state where the attributes of the original image 30 are reflected on the attributes of the target object 32 are acquired from the combined part in the composite image 34 (part occupied by the original image 38). This enables, for example, the user to experience texture and feel that are different between a touch on the uncombined part on the display and a touch on the combined part. Note that the vibration controller 28 may cause the vibrating unit 16 to vibrate in accordance with the attributes of a portion touched by the user on the display. Alternatively, even though the user does not touch the display, the vibration controller 28 may cause the vibrating unit 16 to vibrate. According to this exemplary embodiment as described above, texture and feel in the state where the original image is reflected on the target object is provided to the user.

In addition, if the user selects a different original image or a different target object (target-object image) to be combined and gives a composing instruction, the image composing unit 22 generates a different composite image by using the different original image or the different target object (target-object image). The composite image is displayed on the display. If an original image or a target object is changed, various composite images (composites) having different hue, different texture, or a different feel are provided to the user. For example, this exemplary embodiment may be applied to a shopping site on the Internet or a designing scenario.

The hue, the texture, or the feel of the target object may be changed. For example, if the user designates the hue, the texture, or the feel of the target object by using the UI unit 14, the image composing unit 22 combines a target-object image having the attribute designated by the user and the original image and thereby generates a composite image. The composite image is displayed on the display, and vibration is generated in accordance with the vibration conditions based on the attribute. A composite image having different hue, different texture, and a different feel is thereby provided to the user. The display controller 26 may display a list of pieces of information regarding hue, texture, or feel of the target object on the display, and the user may select hue, texture, or feel from the list. In addition, the hue, the texture, and the feel of the original image (the object) may be changed. Like the case where the attribute of the target object is changed, if the user designates an attribute of the original image, an original image having the attribute and the target-object image are combined, and a composite image is displayed. The composite image having different hue, different texture, and a different feel is thereby provided to the user.

Note that multiple original images may be combined with a target-object image. In this case, texture and feel based on attributes are simulated for each original image.

Hereinafter, modifications will be described.

Modification 1

Modification 1 will be described. In Modification 1, texture and feel are changed in accordance with the specification for (a way of) reflecting an original image with a target object. In the above-described exemplary embodiment, the original image and the target-object image are combined in accordance with the specification in which a pattern corresponding to the original image is knitted in the target-object image. In Modification 1, the original image and the target-object image are combined in accordance with a specification in which the original image is superimposed on (overwrites) the target-object image. In Modification 1, the image composing unit 22 generates a composite image by superimposing the original image on the target-object image. The superimposed part (combined part) in the composite image has the same attributes as those of the original image. In other words, it may be said that the target-object image is overwritten with the original image in the superimposed part.

Figures 8, 9:
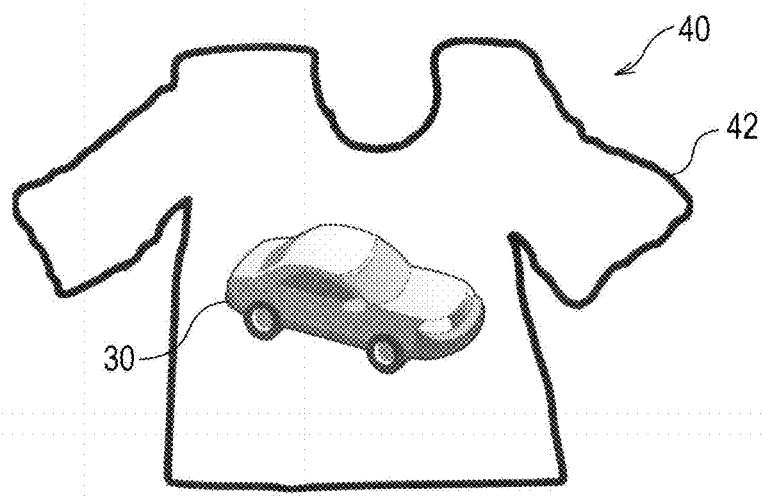
FIG. 8 is a table illustrating attribute information of a composite image.
FIG. 9 is a view illustrating a composite image.

FIG. 8 illustrates an example of attribute information of a composite image according to Modification 1. The composite image according to Modification 1 is an image generated by combining the original image 30 and the target-object image 36. The attributes of an uncombined part (a not superimposed part in which the original image 30 is not superimposed on the target-object image 36) in the composite image are the same as the attributes of the target object 32 (the target-object image 36) (see FIG. 5). The attributes of a combined part (a superimposed part in which the original image 30 is superimposed on the target-object image 36) in the composite image are the same as the attributes of the original image 30 (see FIG. 3).

The display controller 26 displays the composite image having the above-described attribute information on the display. The vibration controller 28 causes the vibrating unit 16 to vibrate in accordance with the attribute information.

According to Modification 1, the hue, the texture, and the feel of the original image 30 are acquired from the combined part (superimposed part) in the composite image, and the hue, the texture, and the feel of the target object 32 (target-object image 36) are acquired from the uncombined part (not superimposed part).

In addition, the image composing unit 22 may set the values of the attributes of the original image 30 as values of the attributes for a specific area of the original image 30 in the composite image and may set the values of the attributes of the target object 32 reflected on the attributes of the original image 30 as values of the attributes for the other area that is except the specific area of the original image 30 in the composite image. The specific area may be set by the user or may be set in advance.

Note that in accordance with an instruction from the user, the controller 24 may execute one of the process according to the exemplary embodiment and a process according to Modification 1. In other words, if the user gives an instruction to execute the process according to Modification 1 by using the UI unit 14 in a state where the composite image 34 including the target object 32 on which the attributes of the original image 38 are reflected is displayed on the display as in the exemplary embodiment, the image composing unit 22 generates a composite image according to Modification 1, and the display controller 26 displays, on the display, the composite image according to Modification 1 instead of the composite image 34. On the contrary, if the user gives an instruction to execute the process according to the exemplary embodiment in a state where the composite image according to Modification 1 is displayed on the display, the composite image 34 instead of the composite image according to Modification 1 is displayed on the display. Designing the switching between the processes as described above enables a composite image meeting the taste of the user to be provided.

The image composing unit 22 may change the specification for reflecting an original image on a target object in accordance with a location in which the original image is to be reflected. For example, the image composing unit 22 combines an original image and a target-object image in a specific location in a target-object image in accordance with the same specification as that in the above-described exemplary embodiment (specification in which a pattern corresponding to the original image is knitted in the target-object image). In a different location in the target-object image, the image composing unit 22 combines the original image and the target-object image in accordance with the specification according to Modification 1. Texture and feel varying with the location in the composite image is thereby simulated.

Modification 2

Modification 2 will be described. In Modification 2, the image composing unit 22 generates a composite image by using predetermined attributes (for example, initial values) as the attributes of the target object. An uncombined part in the composite image has the predetermined attributes instead of the attributes of the target object, and a combined part in the composite image has the attributes of the original image.

FIG. 9 illustrates an example of a composite image according to Modification 2. A composite image 40 according to Modification 2 is an image generated by combining the original image 30 and the target-object image 36. In combining, the image composing unit 22 sets predetermined values (for example, the initial values) as the values of the color, the texture, and the feel of the target object 32 (target-object image 36) and combines the original image 30 and the target-object image 36. A target-object image 42 in the composite image 40 is an image in which the initial values as the attribute values are reflected. For example, zero (nil, null, invalid, or the like) is set as the initial values. In other words, the target object 32 is colorless, and the texture, the texture image-correction value, the frequency, and the amplitude have null values. Only the shape (contour) of the target object 32 is thereby depicted in the composite image 40. Since the attribute values of the target object 32 are set to zero, the original image 30 in the composite image 40 has attributes prior to the combining.

FIG. 10 illustrates attribute information of the composite image 40. As described above, the initial values (null) are set as the attributes of an uncombined part (part other than the original image 30) in the composite image 40. The attributes of the original image 30 prior to the combining are set as the attributes of a combined part (part corresponding to the original image 30) in the composite image 40.

According to Modification 2, the composite image in the state where the hue, the material, and the feel of the target object are removed is displayed. Accordingly, the hue, the material, and the feel of the original image are provided to the user more clearly than in the case where the attributes of the target object are reflected on the attributes of the original image. For example, when a relative positional relationship or a size relationship between the target object and the original image is checked, it is convenient.

For example, if the user gives an instruction to remove the attributes of the target object by using the UI unit 14 when the composite image 34 illustrated in FIG. 6 (image on which the attributes of the target object 32 are reflected) is displayed on the display, the image composing unit 22 may generate the composite image 40 illustrated in FIG. 9, and the display controller 26 may display the composite image 40 on the display instead of the composite image 34 or together with the composite image 34. If the user designates hue, texture, or feel for the target object by using the UI unit 14 in this state, the image composing unit 22 combines a target-object image having the attribute designated by the user and the original image, and the display controller 26 displays the composite image generated by the combining on the display. This enables the attributes of the original image on which the attributes of the target object are not reflected to be provided to the user in a user-friendly manner and also enables the attributes of the composite image to be controlled.

Note that one of the above-described process according to the exemplary embodiment, the process according to Modification 1, and the process according to Modification 2 may be executed in such a manner that switching among the processes is performed in accordance with an instruction from the user.

Modification 3

Modification 3 will be described. In Modification 3, texture and feel simulated on the screen are changed in accordance with movement of an object depicted in an image (such as an original image, a target-object image, or a composite image). In other words, in accordance with the movement, the vibration controller 28 changes at least one of the frequency and the amplitude of vibration caused by the vibrating unit 16 and thereby controls the vibration caused by the vibrating unit 16.

FIG. 11 illustrates an example of a composite image according to Modification 3. A composite image 44 according to Modification 3 is an image generated by combining the original image 30 and the target-object image 36. The original image 38 in the composite image 44 is an image in which the attributes of the target object are reflected on the original image 30. For example, as illustrated by using reference signs 46, a T-shirt serving as a target object and depicted in the composite image 44 cockles. In other words, the composite image 44 is displayed as a moving image, and part or the entirety of the T-shirt cockles. In this case, the vibration controller 28 controls the vibration caused by the vibrating unit 16 to provide strong feel feedback for rough texture in portions having high waves (that is, projecting portions), that is, in projecting-portion images representing the respective projecting portions in the composite image 44. In contrast, the vibration controller 28 controls the vibration caused by the vibrating unit 16 to provide weak feel feedback for rough texture in portions having low waves (that is, recessed portions), that is, in a recessed-portion images representing the respective recessed portions in the composite image 44.

For example, if an image has a cockle, an attribute that is strong feel feedback for rough texture is assigned to each projecting-portion image. In accordance with the attribute assigned to the projecting-portion image, the vibration controller 28 controls the vibration caused by the vibrating unit 16 in the corresponding portion in which the projecting-portion image is displayed on the screen. In contrast, an attribute that is weak feel feedback for rough texture is assigned to each recessed-portion image. In accordance with the attribute assigned to the recessed-portion image, the vibration controller 28 controls the vibration caused by the vibrating unit 16 in the corresponding portion in which the recessed-portion image is displayed on the screen.

If the user applies a force to or performs a shaking operation on a part in which the composite image 44 is displayed on the screen by using the UI unit 14, the display controller 26 may display the composite image 44 on the display such that the target object displayed in the composite image 44 cockles in accordance with the user's operation. If the original image in the composite image is changed to a different original image, or if the target-object image is changed to a different target-object image, a cockle may occur in the composite image.

The composite image has been taken as an example in the description; however, also in a case where the original image or the target-object image is displayed, the texture and the feel are changed in accordance with the movement of the object depicted in the image in the same manner as in the above.

In addition, a recessed portion is located deeper than a projecting portion in the real space and thus is less likely to be touched than the projecting portion. However, when the user strongly presses the recessed portion, it is more likely for the user to touch the portion. To simulate the depth feel on the screen, the vibration controller 28 changes the degree of feel feedback in accordance with pressure (for example, pressure applied by using a finger of the user) applied to a portion representing the recessed portion. The pressure is detected by the detection unit 20 (for example, a pressure sensor). For example, as the pressure applied to the portion representing the recessed portion in the image is increased, the vibration controller 28 increases the degree of the feel feedback. This enables the user to simulatively experience the sense of touch on the recessed portion.

Modification 4

Modification 4 will be described. In Modification 4, texture and feel simulated on the screen are changed in accordance with an irradiation state of an object (how the object is irradiated) depicted in an image (such as an original image, a target-object image, or a composite image). In other words, in accordance with the irradiation state, the vibration controller 28 changes at least one of the frequency and the amplitude of vibration caused by the vibrating unit 16 and controls the vibration caused by the vibrating unit 16. For example, the vibration controller 28 changes the feel in accordance with the degree of brightness of a portion of the image. Specifically, the vibration controller 28 controls the vibration caused by the vibrating unit 16 in the following manner. As the degree of brightness of a portion in the image is increased, the degree of a slick texture is increased (that is, friction is reduced). As the degree of darkness of a portion is increased, the degree of a rough texture is increased (that is, friction is increased).

According to Modification 4, the degrees of brightness and darkness of the image are expressed by using texture and feel.

The vibration controller 28 may also change at least one of the frequency and the amplitude for the vibration caused by the vibrating unit 16 in accordance with a reflection state (such as the reflection intensity or a reflection angle) of the object displayed in the image. The texture and the feel simulated on the screen are thereby changed in accordance with the reflection state. Even though the object is irradiated in the same irradiation state any time, the object may be in a different reflection state depending on the reflection angle, light absorption, or the like. Controlling the vibration on the basis of the reflection state as described above enables texture and feel to be simulated in accordance with the reflection state.

If the irradiation state differs among portions of the object displayed in the image, the vibration controller 28 changes the frequency or the amplitude for the vibration for each portion and thereby simulates texture and feel for each portion.

Modification 5

Figure 12:
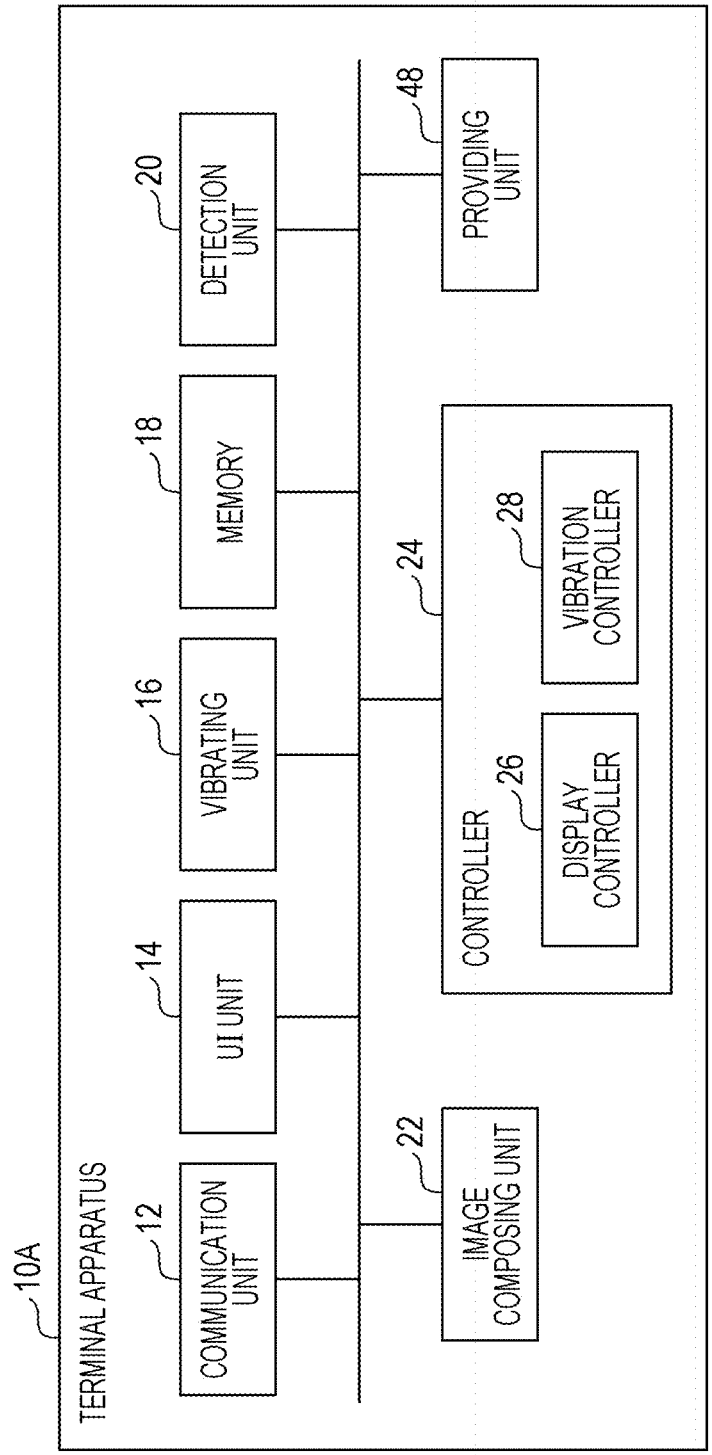
FIG. 12 is a block diagram illustrating the configuration of a terminal apparatus according to a modification.

Modification 5 will be described. FIG. 12 illustrates an example of a terminal apparatus 10A according to Modification 5. The terminal apparatus 10A includes a providing unit 48 in addition to the configuration of the terminal apparatus 10 illustrated in FIG. 1.

The providing unit 48 has a function of providing (or suggesting) a target object appropriate for an attribute of the original image. For example, a database having multiple target objects registered therein is created in advance and is stored in an external apparatus such as a server. The providing unit 48 searches the database for a target object appropriate for an attribute of the original image via the communication path such as the Internet. For example, in the database, for each of target objects, each attribute of the target object is in advance associated with the same attribute as the attribute of the target object or a different attribute appropriate for the attribute. For example, if texture or feel serving as an attribute of the target object is a rough texture, the same attribute that is the rough texture is associated with the attribute of the target object, the rough texture serving as an attribute appropriate for (having affinity with) the rough texture. If texture or feel serving as the attribute of the target object is an uneven texture, a slick texture is associated with the attribute of the target object, the slick texture serving as the attribute appropriate for (having affinity with) the uneven texture. Note that the association performed in these manners is merely an example, and association different from these may be designated in advance. An attribute appropriate for (having affinity with) the color of the target object or a feel-simulating vibration condition may also be associated with the attribute of the target object. The providing unit 48 receives an attribute of the original image, identifies, as a target object appropriate for the attribute of the original image, a target object having an attribute associated with the attribute of the original image in the database as described above, and provides the target object. Note that the database may be installed in the terminal apparatus 10.

Hereinafter, Modification 5 will be described by taking a specific example. For example, if the user designates the original image 30 illustrated in FIG. 2 by using the UI unit 14, the providing unit 48 identifies, in the above-described database, a target object having an attribute associated with an attribute of the original image 30 (an attribute illustrated in FIG. 3). As illustrated in FIG. 3, the texture of the car displayed in the original image 30 is a Metallic texture. The providing unit 48 identifies an attribute of a target object associated with the metallic texture in the database and provides the target object as a target object appropriate for the attribute of the original image 30. For example, if a rough texture is associated, as the attribute appropriate for the metallic texture, with the metallic texture in the database, the providing unit 48 searches the database for a target object having the rough texture as an attribute.

FIGS. 13 and 14 illustrate attribute information of the target object having a rough texture as an attribute. The attribute information illustrated in FIG. 13 is attribute information of the target object 32 illustrated in FIG. 4. The attribute information illustrated in FIG. 14 is the attribute information of cloth α.

The providing unit 48 acquires information regarding a target object appropriate for the attribute of the original image 30 (for example, attribute information and target-object image data) from the database. The display controller 26 displays the information regarding the target object on the display. For example, the display controller 26 displays a list of target objects appropriate for the attribute of the original image 30 on the display. When the user selects a target object from the list, the image composing unit 22 generates a composite image by combining an image of the target object selected by the user and the original image 30, and the display controller 26 displays the composite image on the display.

Alternatively, if information regarding a target object is acquired by the providing unit 48, the image composing unit 22 may change a target-object image in a displayed composite image to an image of the target object, combine the changed target-object image and the original image 30, and generate a new composite image. For example, if the user gives an instruction to acquire a target object appropriate for an attribute of the original image 30 in a state where the composite image 34 illustrated in FIG. 6 is displayed on the display, the providing unit 48 acquires information regarding the target object appropriate for the attribute of the original image 30 as described above. For example, if a target object having the attributes illustrated in FIG. 13 or 14 is appropriate for the attribute of the original image 30, the image composing unit 22 changes the target-object image in the composite image 34 to an image of the target object having the attributes illustrated in FIG. 13 or 14, and combines the original image 30 and the changed target-object image. For example, if a target object having the attributes illustrated in FIG. 14 is newly provided, the image composing unit 22 changes the target-object image in the composite image 34 to a target-object image depicting the cloth α, combines the target-object image and the original image 30, and thereby generates a composite image. In more detailed explanation, the image composing unit 22 changes the attributes of the target object to the attributes of the cloth α without changing the shape of a T-shirt that is the target object displayed in the composite image 34 and composes an image. A composite image in a state where the original image 30 is reflected on the target object having the attributes illustrated in FIG. 14 is thereby acquired.

Note that if multiple target objects appropriate for the attribute of the original image 30 are provided, the image composing unit 22 may generate multiple composite images by combining the original image 30 and each target-object image for each target object, and the display controller 26 may display the multiple composite images on the display. For example, the display controller 26 makes a list of the multiple composite images and displays the list on the display. This enables the user to see and compare the multiple composite images at a time.

According to Modification 5, the information regarding the target object appropriate for the attribute of the original image is provided to the user.

For example, in a case where a garment is tailored, information such as cloth as a target object appropriate for an attribute of the original image is provided to the user.

Note that the user may designate an attribute of the target object by using the UI unit 14. In this case, the providing unit 48 searches the database for a target object having the attribute designated by the user and acquires information regarding the target object (for example, attribute information or target-object image data). The display controller 26 displays a composite image generated by combining the target-object image and the original image on the display.

The providing unit 48 may be installed in an external apparatus such as a server and implement a service for providing a target object appropriate for an attribute of the original image via the communication path such as the Internet. In this case, the providing unit 48 does not have to be installed in the terminal apparatus 10A.

Modification 6

Modification 6 will be described. In Modification 6, texture and feel provided on the screen are changed in accordance with the environment of the terminal apparatus 10 (for example, the ambient environment of the terminal apparatus 10). Examples of an index value of the environment include temperature, humidity, atmospheric pressure, an airflow rate, weather, a weather forecast, a wind direction, brightness, the degree of sunniness (luminance), latitude, longitude, height, and altitude above sea level. The concept of the environment may include an interior and an exterior. The index value of the environment is detected by a sensor. The sensor may be installed in the terminal apparatus 10 or in a place other than the place of the terminal apparatus 10 or different equipment. The image composing unit 22 changes an attribute of an image (such as an original image, a target-object image, or a composite image) on the basis of the index value of the environment acquired from the sensor, and the display controller 26 displays, on the display, the image having the attribute changed in accordance with the environment.

The image composing unit 22 may also change an attribute of a displayed image on the basis of a relative relationship between the attribute of the displayed image and the environment. In other words, the image composing unit 22 may change the attribute of the displayed image to an attribute for simulating texture and an attribute that apply to a combination of the attribute of the displayed image and the environment. The texture and the attribute that apply to the combination of the attribute of the displayed image and the environment are thereby simulated.

Specific examples will be described. For example, if an object depicted in the displayed image (for example, a metal object) is an object that softens in a high-temperature range, and if the ambient temperature of the terminal apparatus 10 is in the high-temperature range, the image composing unit 22 changes an attribute of the image (for example, the feel-simulating vibration conditions) to enable the user to experience a soft feel on a portion representing the object in the image when the user touches the portion. When the user touches the portion representing the object on the screen, a soft feel is thereby provided to the user. Note that the high-temperature range is a temperature range higher than or equal to a predetermined temperature threshold.

If the terminal apparatus 10 is installed in a sunny environment (for example, an environment having luminance higher than or equal to a threshold), the object depicted in the displayed image may be displayed shinily.

If the object depicted in the displayed image (for example, a flag) is an object that streams or flutters in the wind, and if the ambient airflow rate of the terminal apparatus 10 is greater than or equal to a threshold, the object may stream or flutter in the image.

If the object depicted in the displayed image (for example, confectionery such as ice cream) is an object that melts in a high-temperature range, and if the ambient temperature of the terminal apparatus 10 is in the high-temperature range, the object may melt in the image. As described above, not only texture and feel but also the shape of an object depicted in the image may be changed.

According to Modification 6, texture and feel are simulated in accordance with the environment of the terminal apparatus 10.

Modification 7

Modification 7 will be described. In Modification 7, feel is changed in accordance with the degree of depth of an object depicted in a displayed image (such as an original image, a target-object image, or a composite image).

Figure 15:
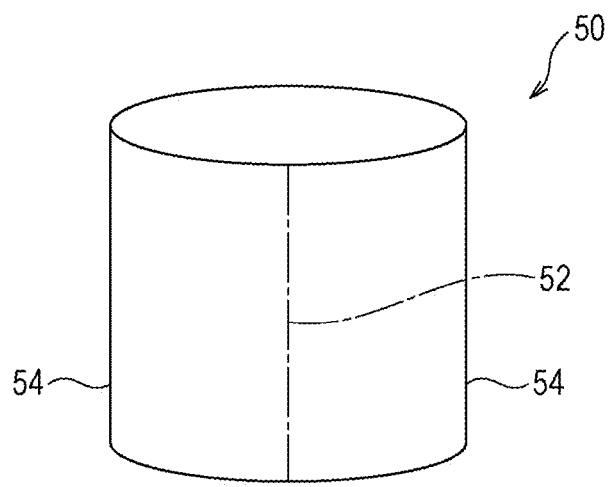
FIG. 15 is a view illustrating an image.

Modification 7 will be described in detail with reference to FIG. 15. For example, an image depicting a columnar object 50 is displayed. The locations of portions of the surface of the object 50 in the real space are considered with respect to the location of the screen. A front-most part 52 indicated by a broken line is located closest to the screen. Since the object 50 has a curved surface, end-representing parts 54 of the object 50 seen on the screen are each located in a deeper location in the real space than the front-most part 52. Accordingly, if the front-most part 52 is set on the screen, and when the user touches the screen, it is possible for the user to touch the front-most part 52 of the object 50 in the real space but is not possible to touch each end-representing part 54. In other words, even though the user touches a portion in which the end-representing part 54 is displayed on the screen, it is actually not possible to touch the end-representing part 54 in the real space.

To simulate the feel described above on the screen, attributes are assigned to the respective portions of the image depicting the object 50. The vibration controller 28 controls the vibration caused by the vibrating unit 16 for each portion in accordance with the attribute of the portion and thereby simulates the texture and the feel for the portion. For example, the image depicting the object 50 includes attribute information indicating that the object 50 is a columnar object. Referring to the attribute information enables relative positional relationships between the locations of the portions of the object 50 to be recognized. Accordingly, when the image depicting the object 50 is displayed on the display, each relationship between the locations of the portions of the object 50 is recognized on the basis of the display location and the display angle of the object 50 on the screen, and each portion of the image depicting the object 50 is assigned an attribute corresponding to the positional relationship. The attribute is assigned to the portion by, for example, the controller 24.

For example, attribute information for providing strongest feel feedback (for example, feel-simulating vibration conditions) is set for the front-most part 52. Attribute information for providing feel feedback that gradually weakens from the front-most part 52 to the end-representing part 54 is set for the locations of the portions between the front-most part 52 and the end-representing part 54. The vibration controller 28 controls the vibration caused by the vibrating unit 16 in accordance with the attribute information as described above. When the user touches a portion representing the front-most part 52 on the screen, the strongest feel is simulated. As the user moves a finger from the front-most part 52 toward the end-representing part 54, a gradually weakened feel is simulated.

According to Modification 7, texture and feel in the real space are simulatively provided to the user.

The vibration controller 28 may change the vibration caused by the vibrating unit 16 in accordance with a pressure at which the user presses the screen. For example, the vibration controller 28 controls the vibrating unit 16 such that as the user presses a portion representing the end-representing part 54 (an end image) on the screen more strongly (as an applied pressure is increased), stronger feel feedback is provided. Feel of touching a portion deeper than the front-most part 52 is thereby provided to the user simulatively.

Note that texture and feel are simulated by using the vibration in the exemplary embodiment and the modifications but may be simulated by using a technique different from the vibration.

The terminal apparatuses 10 and 10A described above are implemented, for example, in cooperation between hardware and software. Specifically, the terminal apparatuses 10 and 10A include one or more processors (not illustrated) such as a central processing unit (CPU). The one or more processors read and run a program stored in a memory device (not illustrated), and the functions of the components of the terminal apparatuses 10 and 10A are thereby implemented. The program is stored in the memory device via a recording medium such as a compact disc (CD) or a digital versatile disk (DVD) or via a communication path such as a network. In another example, the components of the terminal apparatuses 10 and 10A may be implemented by hardware resources such as a processor, an electronic circuit, and an application specific integrated circuit (ASIC). A device such as a memory may be used in the implementation. In a further example, the components of the terminal apparatuses 10 and 10A may be implemented by a digital signal processor (DSP), a field programmable gate array (FPGA), or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a controller that controls texture and feel for depicting a composite image in which an original image is reflected on a target object, the controller controlling the texture and the feel of the composite image in accordance with an attribute of the original image and an attribute of the target object,
        wherein the composite image comprises a combined Bart and an uncombined part, the combined part is a part in which the target object is overlapped by the original image, the uncombined part is a part in which the target object is not overlapped by the original image,
        wherein the controller controls the texture and the feel in the combined part in accordance with the attribute of the original image and the attribute of the target object, and
        wherein the controller controls the texture and the feel in the uncombined part in accordance with the attribute of the target object.

2. The information processing apparatus according to claim 1, further comprising:
    a vibrating unit that applies vibration to a screen on which the composite image is displayed,
        wherein the controller controls the feel by controlling the vibration caused by the vibrating unit.

3. The information processing apparatus according to claim 2,
    wherein the controller controls at least one of a frequency and an amplitude of the vibration caused by the vibrating unit.

4. The information processing apparatus according to claim 1,
    wherein the controller changes the texture and the feel in accordance with movement of an object depicted in the composite image displayed on a display.

5. The information processing apparatus according to claim 1,
    wherein the controller changes the texture and the feel in accordance with unevenness of an object depicted in the composite image.

6. The information processing apparatus according to claim 1,
    wherein the controller changes the texture and the feel in accordance with pressure applied to a portion of a display, the portion corresponding to a portion of the displayed image.

7. The information processing apparatus according to claim 1,
    wherein the controller changes the texture and the feel in accordance with an irradiation state of an object depicted in the composite image.

8. The information processing apparatus according to claim 1,
    wherein the controller controls the texture by controlling hue.

9. The information processing apparatus according to claim 1,
    wherein the controller changes the texture and the feel in accordance with a specification for reflecting the original image on the target object.

10. The information processing apparatus according to claim 9, wherein the specification for reflecting the original image is changed in accordance with a location in which the original image is reflected on the target object.

11. The information processing apparatus according to claim 1, further comprising:
a providing unit that provides the target object appropriate for the attribute of the original image.

12. The information processing apparatus according to claim 1,
wherein the controller further changes the texture and the feel in accordance with an environment in which the information processing apparatus is installed.

13. The information processing apparatus according to claim 1,
wherein the controller changes the texture and the feel in accordance with a degree of depth of an object depicted in the composite image with respect to a display on which the composite image is displayed.

14. A non-transitory computer readable medium storing a program causing a computer to execute a process comprising:
controlling texture and feel for depicting a composite image in which an original image is reflected on a target object, the controlling being performed on the texture and the feel of the composite image in accordance with an attribute of the original image and an attribute of the target object,
wherein the composite image comprises a combined part and an uncombined part, the combined part is a part in which the target object is overlapped by the original image, the uncombined part is a part in which the target object is not overlapped by the original image,
wherein the texture and the feel in the combined part are controlled in accordance with the attribute of the original image and the attribute of the target object, and
wherein the texture and the feel in the uncombined part are controlled in accordance with the attribute of the target object.

15. An information processing apparatus comprising:
control means for controlling texture and feel for depicting a composite image in which an original image is reflected on a target object, the control means controlling the texture and the feel of the composite image in accordance with an attribute of the original image and an attribute of the target object,
wherein the composite image comprises a combined part and an uncombined part, the combined part is a part in which the target object is overlapped by the original image, the uncombined part is a part in which the target object is not overlapped by the original image,
wherein the control means controls the texture and the feel in the combined part in accordance with the attribute of the original image and the attribute of the target object, and
wherein the control means controls the texture and the feel in the uncombined part in accordance with the attribute of the target object.

* * * * *